US012397486B2

(12) United States Patent
Takehana et al.

(10) Patent No.: US 12,397,486 B2
(45) Date of Patent: Aug. 26, 2025

(54) COOLING MOLD, AND APPARATUS AND METHOD FOR MANUFACTURING RESIN MOLDED ARTICLE

(71) Applicant: NISSEI ASB MACHINE CO., LTD., Nagano (JP)

(72) Inventors: Daisaburo Takehana, Nagano (JP); Yasuhide Maruyama, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 424 days.

(21) Appl. No.: 17/602,218

(22) PCT Filed: Apr. 8, 2020

(86) PCT No.: PCT/JP2020/015844
§ 371 (c)(1),
(2) Date: Oct. 7, 2021

(87) PCT Pub. No.: WO2020/209294
PCT Pub. Date: Oct. 15, 2020

(65) Prior Publication Data
US 2022/0143886 A1    May 12, 2022

(30) Foreign Application Priority Data
Apr. 8, 2019    (JP) ................. 2019-073501

(51) Int. Cl.
    *B29C 45/73*    (2006.01)
    *B29C 45/72*    (2006.01)
    (Continued)

(52) U.S. Cl.
    CPC .............. *B29C 45/73* (2013.01); *B29C 49/06* (2013.01); *B29C 49/42065* (2022.05);
    (Continued)

(58) Field of Classification Search
    CPC .............. B29C 49/06; B29C 49/42079; B29C 49/42091; B29C 49/64; B29C 49/6427;
    (Continued)

(56) References Cited

U.S. PATENT DOCUMENTS

| 4,592,719 A | 6/1986 | Bellehache et al. |
| 5,447,426 A | 9/1995 | Gessner et al. |

(Continued)

FOREIGN PATENT DOCUMENTS

| DE | 102 15 722 A1 | 10/2003 |
| JP | 2509803 B2 | 6/1996 |

(Continued)

OTHER PUBLICATIONS

Extended European Search Report issued to European Patent Application No. 20786846.4 dated Jan. 3, 2023.
(Continued)

*Primary Examiner* — Jerzi H Moreno Hernandez
(74) *Attorney, Agent, or Firm* — GREENBLUM & BERNSTEIN, P.L.C.

(57) ABSTRACT

A cooling mold for cooling a resin preform that has a gate portion protruding outward from a center of a bottom portion, in which an accommodating space that accommodates the preform is formed in the cooling mold, a bottom region facing the bottom portion of the preform in the accommodating space has a shape following the bottom portion of the preform, and an air sucking hole for sucking air is formed in the bottom region at a position shifted from the center of the bottom portion of the preform. In the accommodating space, a region facing a body portion of the perform and a bottom region facing the bottom portion of the perform are formed as a single member.

8 Claims, 8 Drawing Sheets

(51) Int. Cl.
  *B29C 49/06* (2006.01)
  *B29C 49/42* (2006.01)
  *B29C 49/64* (2006.01)
(52) U.S. Cl.
  CPC .. *B29C 49/42077* (2022.05); *B29C 49/42079* (2022.05); *B29C 49/42091* (2022.05); *B29C 49/42101* (2022.05); *B29C 49/64* (2013.01); *B29C 49/6427* (2013.01); *B29C 2045/7214* (2013.01); *B29C 49/6467* (2022.05)
(58) Field of Classification Search
  CPC ............... B29C 49/6467; B29C 45/73; B29C 2045/7214
  See application file for complete search history.

(56) References Cited

U.S. PATENT DOCUMENTS

| | | | | |
|---|---|---|---|---|
| 6,737,007 | B2* | 5/2004 | Neter | B29C 45/0053 |
| | | | | 425/526 |
| 7,156,647 | B2* | 1/2007 | Zoppas | B29C 45/7207 |
| | | | | 425/534 |
| 7,648,662 | B2* | 1/2010 | Pesavento | B29C 49/6463 |
| | | | | 264/237 |
| 9,333,695 | B2 | 5/2016 | Yamaguchi et al. | |
| 11,097,459 | B2 | 8/2021 | Nishiyama et al. | |
| 2006/0204605 | A1* | 9/2006 | Neter | B29C 49/6427 |
| | | | | 425/526 |
| 2006/0204607 | A1 | 9/2006 | Neter et al. | |
| 2012/0263820 | A1 | 10/2012 | Thoemmes | |
| 2013/0236589 | A1 | 9/2013 | Yamaguchi et al. | |
| 2022/0055279 | A1* | 2/2022 | Oike | B29C 49/64 |

FOREIGN PATENT DOCUMENTS

| | | |
|---|---|---|
| JP | 2000-158525 A | 6/2000 |
| JP | 2001-18274 A | 1/2001 |
| JP | 2004-521779 A | 7/2004 |
| WO | 2012/057016 A1 | 5/2012 |
| WO | 2017/073791 A1 | 5/2017 |

OTHER PUBLICATIONS

International Search Report issued in International Patent Application No. PCT/JP2020/015844, dated Jun. 16, 2020, along with English translation thereof.

Written Opinion of the International Searching Authority issued in International Patent Application No. PCT/JP2020/015844, dated Jun. 16, 2020, along with English translation thereof.

* cited by examiner

COOLING MOLD, AND APPARATUS AND METHOD FOR MANUFACTURING RESIN MOLDED ARTICLE

BACKGROUND OF THE INVENTION

Field of the Invention

The present invention relates to a cooling mold, and an apparatus and a method for manufacturing a resin molded article.

Description of the Related Art

In blow molding of a resin container, a configuration has been proposed in which a resin preform released from an injection mold is forcibly cooled using a cooling mold different from the injection mold (for example, see WO 2017-073791 A).

Regarding this type of cooling mold, there is also known a mold that sucks air between a mold and a preform to bring the preform into close contact with a surface of the mold (for example, see JP 2004-521779 A and JP 2509803 B2).

In a bottom portion of an injection-molded preform, a gate portion that becomes a resin introduction mark from a hot runner into an injection mold is formed in a manufacturing process. When blow-molding a container from a preform, it is preferred, in terms of appearance and quality of a container after molding, to completely eliminate a gate portion of a preform from a bottom portion thereof. However, it is actually difficult to mechanically cut off a gate portion of a preform with high accuracy due to restrictions such as molding conditions of a preform and the like and apparatus configurations.

On the other hand, in a blow molding manufacturing cycle, it is desired to further shorten molding cycle time of a container. For example, when a process of mechanically cutting off a gate portion of a preform is added, molding cycle time of a container is lengthened by time of the added cutting process.

SUMMARY OF THE INVENTION

One aspect of the present invention is a cooling mold for cooling a resin preform that has a gate portion protruding outward from a center of a bottom portion, in which an accommodating space that accommodates the preform is formed in the cooling mold, a bottom region facing the bottom portion of the preform in the accommodating space has a shape following the bottom portion of the preform, and an air sucking hole that sucks air is formed in the bottom region at a position shifted from the center of the bottom portion of the preform.

Further features of the present invention will become apparent from the following description of exemplary embodiments with reference to the attached drawings.

BRIEF DESCRIPTION OF THE DRAWINGS

Figure 1:
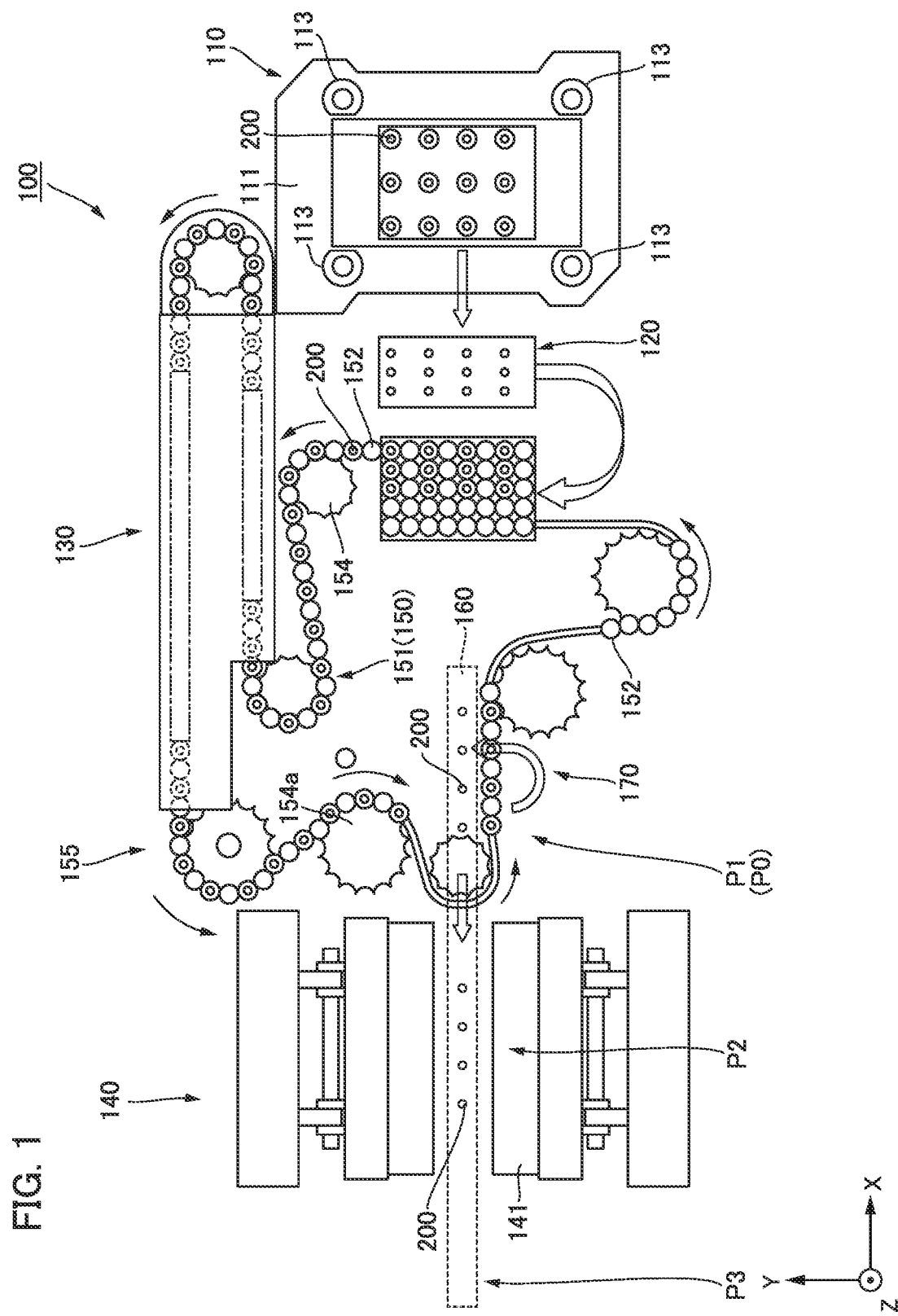
FIG. 1 is a plan view schematically illustrating a configuration of a blow molding apparatus.

Hereinafter, embodiments of the present invention will be described with reference to the drawings.

In the embodiments, for easy understanding, structures and elements other than a main part of the present invention will be described in a simplified or an omitted manner. In the drawings, identical elements are denoted by identical reference numerals. Note that shapes, dimensions, and the like of respective elements illustrated in the drawings are schematically illustrated, and do not indicate actual shapes, dimensions, and the like.

<Description of Blow Molding Apparatus>

Figure 2:
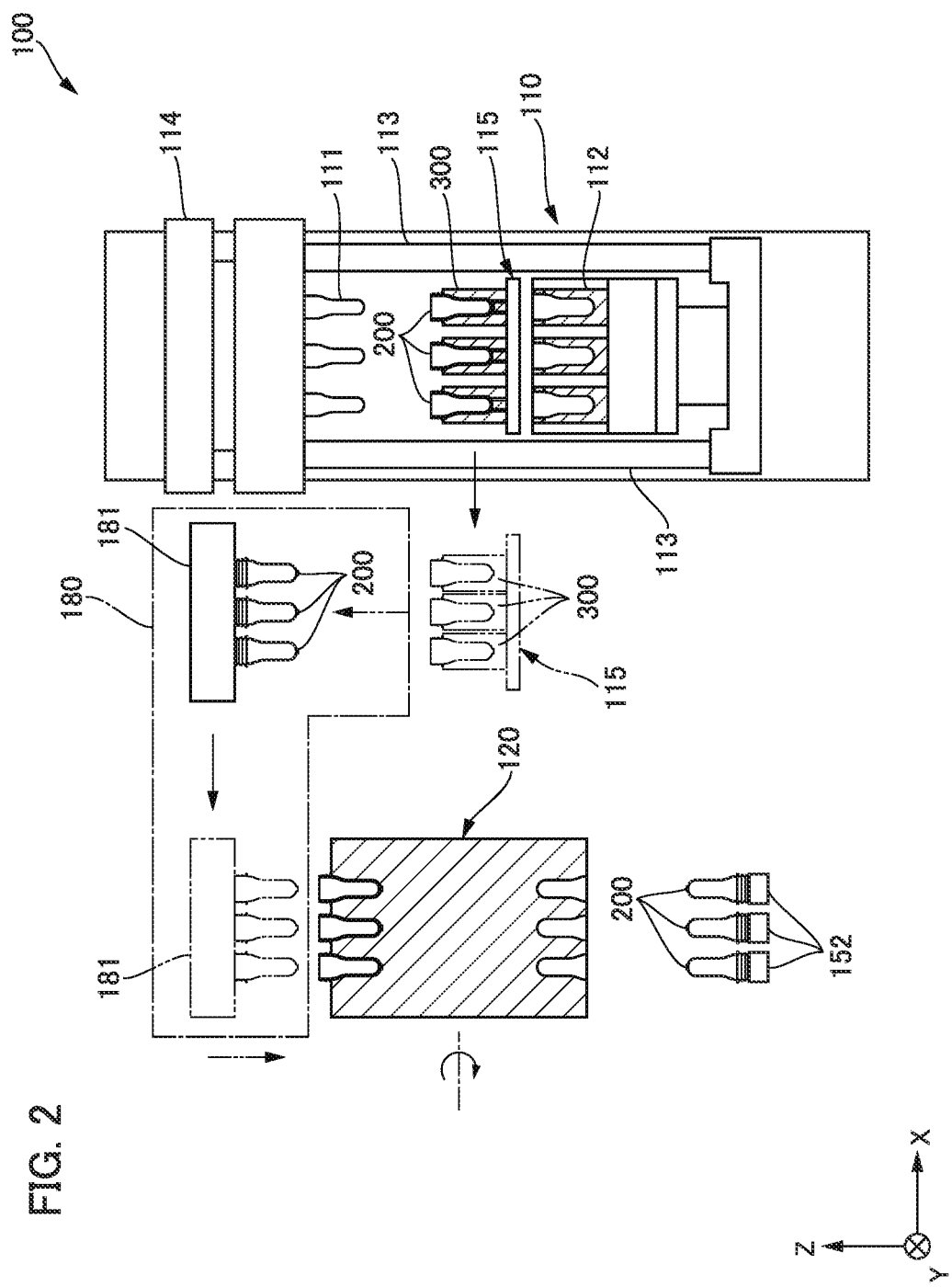
FIG. 2 is a view schematically illustrating conveyance of a preform in an injection molding unit and a cooling unit.

First, a blow molding apparatus 100, an example of a manufacturing apparatus for manufacturing a resin container, will be described with reference to FIG. 1. FIG. 1 is a plan view schematically illustrating a configuration of a blow molding apparatus. FIG. 2 is a view schematically illustrating conveyance of a preform in an injection molding unit and a cooling unit.

The blow molding apparatus 100 according to the present embodiment performs a blow molding method called a 1.5 stage method having advantages of both a hot parison method and a cold parison method. In the blow molding method in the 1.5 stage method, basically similarly to the hot parison method (one stage method), a preform having heat from injection molding is blow-molded to manufacture a container. However, a cycle of blow molding in the 1.5 stage method is set to be shorter than a cycle of injection molding of a preform. A plurality of preforms molded in one injection molding cycle is blow-molded in a plurality of blow molding cycles. Although not particularly limited, a ratio (N:M) of the number (N) of preforms simultaneously injection-molded and the number (M) of containers simultaneously blow-molded is set to 3:1, for example.

As illustrated in FIG. 1, the blow molding apparatus 100 includes an injection molding unit 110, a cooling unit 120, a heating unit 130, and a blow molding unit 140.

The blow molding apparatus 100 also includes a continuous conveying unit 150 that conveys preforms 200 carried out from the cooling unit 120 to the blow molding unit 140 via the heating unit 130. The continuous conveying unit 150 is a conveying device that continuously conveys conveying jigs 152 holding the preforms 200 along a loop-shaped conveying line 151 that has a plurality of curved portions. In other words, the continuous conveying unit 150 can repeatedly convey the conveying jigs 152 each along the loop-shaped conveying line 151.

The injection molding unit 110 injection-molds the bottomed tubular preforms 200 that are resin molded articles.

As illustrated in FIG. 2, the injection molding unit 110 includes core molds 111 disposed above, cavity molds 112 disposed below, and a mold clamping mechanism 114 that clamps the core molds 111 and the cavity molds 112 with tie bars 113. The injection molding unit 110 injection-molds the preforms 200 by filling injection spaces formed by the core molds 111 and the cavity molds 112 with a resin material (raw material) from an injection device (not illustrated).

The injection molding unit 110 according to the present embodiment simultaneously molds, for example, 3 rows×4 (N=12) preforms 200. In addition, the preforms 200 are molded in an upright state with neck portions facing upward in the injection molding unit 110, and the preforms 200 are conveyed in the upright state in the injection molding unit 110.

As illustrated in FIG. 2, the injection molding unit 110 includes a receiving unit 115 that takes out injection-molded preforms to the outside of the injection molding unit 110.

The receiving unit 115 can move in a horizontal direction (X direction in the drawing) from a receiving position on a lower side of the core molds 111 to a delivery position outside a space surrounded by the tie bars 113.

The receiving unit 115 holds 12 cooling pots 300 that respectively accommodate 3 rows×4 preforms molded in the injection molding unit 110.

Each cooling pot 300 is an example of a cooling mold, and has an accommodating space for each preform 200, corresponding to an outer shape of the preform 200. The cooling pot 300 of the receiving unit 115 has a function of cooling the preform by contacting the accommodated preform 200. The cooling pot 300 also has a function of removing a gate portion of the preform 200. A configuration of the cooling pot 300 will be described later.

Further, the receiving unit 115 includes a mechanism (not illustrated) that adjusts an interval (an interval in the X direction in the drawing) between rows of the cooling pots 300 while moving from the receiving position to the delivery position. As a result, the receiving unit 115 converts the interval between the rows of the preforms 200 from a wide pitch state of the receiving position to a narrow pitch state of the delivery position.

Figure 3A:
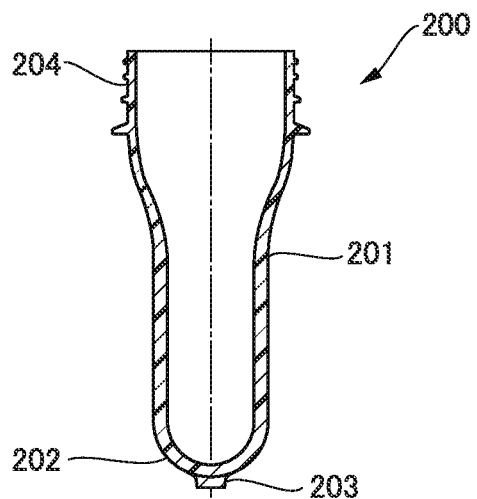
FIGS. 3A to 3C are views illustrating an example of a preform.
Figure 3B:
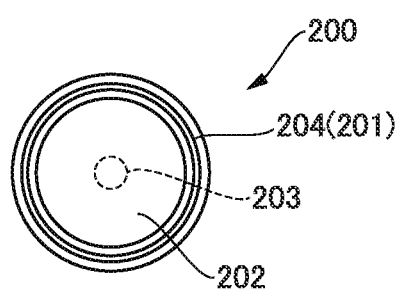
Figure 3C:
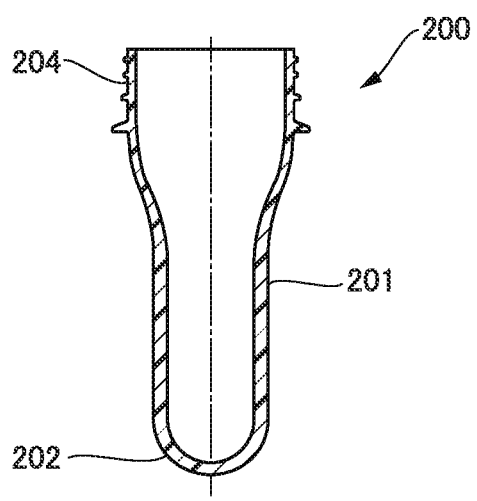

Here, an example of the preform 200 applied in the present embodiment will be described with reference to FIGS. 3A to 3C. FIG. 3A is a longitudinal sectional view of the preform 200 in the upright state as viewed from a front direction, and FIG. 3B is a plan view of the preform 200. FIG. 3C is a longitudinal sectional view illustrating the preform 200 in a state where the gate portion is removed by the injection molding unit 110 or the cooling unit 120 according to the present embodiment.

An entire shape of the preform 200 is a bottomed cylindrical shape in which one end side is opened and the other end side is closed. The preform 200 includes a body portion 201 formed in a cylindrical shape, a bottom portion 202 that closes the other end side of the body portion 201, a gate portion 203 formed in the bottom portion 202, and a neck portion 204 formed in an opening on one end side of the body portion 201.

The gate portion 203 is a resin introduction mark from a hot runner, and is formed so as to protrude outside the bottom portion 202 at a center of the bottom portion 202.

A raw material of the preform 200 is a thermoplastic synthetic resin, and can be appropriately selected according to uses of containers. Specific types of materials include polyethylene terephthalate (PET), polyethylene naphthalate (PEN), polycyclohexanedimethylene terephthalate (PCTA), Tritan (registered trademark: co-polyester manufactured by Eastman Chemical Co., Ltd.), polypropylene (PP), polyethylene (PE), polycarbonate (PC), polyethersulfone (PES), polyphenylsulfone (PPSU), polystyrene (PS), cyclic olefin polymer (COP/COC), polymethylmethacrylate (PMMA: acrylic), polylactic acid (PLA), and the like.

The preform 200 injection-molded by the injection molding unit 110 is supplied from the injection molding unit 110 to the cooling unit 120. The cooling unit 120 forcibly cools the preform 200 molded by the injection molding unit 110. The preform 200 is carried out from the cooling unit 120 in a state of being cooled to a predetermined temperature, and is continuously conveyed along the conveying line 151.

As illustrated in FIG. 2, a conveying device 180 that conveys the preform 200 in the upright state from the receiving unit 115 to the cooling unit is provided between the injection molding unit 110 and the cooling unit 120. The conveying device 180 includes a holding unit 181 that holds the neck portion of the preform 200 in the upright state, and can move the holding unit 181 in a vertical direction (Z direction in the drawing) and the horizontal direction (X direction in the drawing) by an air cylinder (not illustrated).

Figure 4:
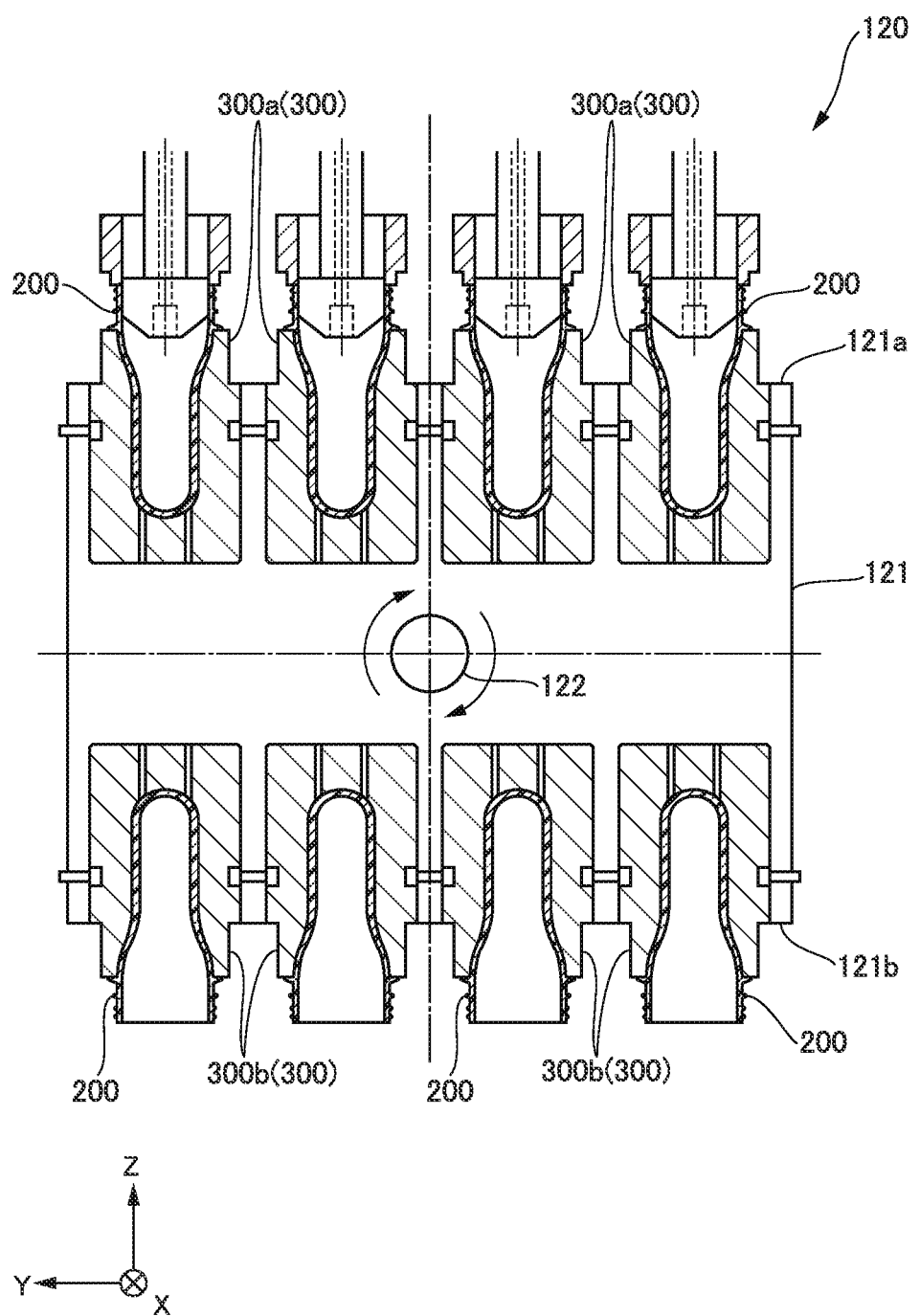
FIG. 4 is a front view illustrating a configuration example of a cooling unit.

As illustrated in FIG. 4, the cooling unit 120 includes an inverting unit 121. The inverting unit 121 is invertible around a shaft 122 extending in the X direction in the drawing as a rotation axis, and is movable up and down in the Z direction (vertical direction) in the drawing. On a first surface 121a illustrated on an upper side in the drawing of the inverting unit 121 and a second surface 121b facing the first surface 121a, 12 cooling pots 300 are disposed on each of the surfaces in order to accommodate 3 rows×4 preforms 200.

In the present embodiment, the cooling pots 300 disposed on the first surface 121a and the second surface 121b in the inverting unit 121 have a configuration similar to the configuration of the cooling pots 300 of the receiving unit 115. The cooling pots 300 in the inverting unit 121 are cooled by a refrigerant circulating through a refrigerant passage (not illustrated) provided in the inverting unit 121. The cooling pots 300 each in the inverting unit 121 have a function of sucking and holding the accommodated preform 200 and a function of removing the gate portion of the preform.

In the following description, the cooling pots 300 disposed on the first surface 121a in the inverting unit 121 are also referred to as first cooling pots 300a, and the cooling pots 300 disposed on the second surface 121b in the inverting unit 121 are also referred to as second cooling pots 300b.

In addition, the inverting unit 121 reverses the preforms 200 in the upright state received from the conveying device 180 to an inverted state in which the neck portions face downward during cooldown time. Then, the preforms 200 in the inverted state are delivered to the conveying jigs 152 of the continuous conveying unit 150, disposed in a plurality of rows below the cooling unit 120. The conveying jigs 152 holding the preforms 200 are sequentially conveyed along the conveying line 151 by driving forces of sprockets 154 or the like.

The heating unit 130 heats the preforms 200 in the inverted state continuously conveyed by the continuous conveying unit 150 to an appropriate stretching temperature. The heating unit 130 includes a plurality of heaters (not illustrated) disposed at predetermined intervals along the conveying line 151 on both sides of the conveying line 151. In the heating unit 130, the preforms 200 in the inverted state are heated while rotating about axial directions of the preforms 200, and the entire preforms 200 are uniformly heated.

Further, the blow molding apparatus 100 includes an intermittent conveying unit 160 and a delivery unit 170 on a downstream side of the heating unit 130 in the conveying line 151.

The intermittent conveying unit 160 holds a plurality of (M, e.g., four) preforms 200 heated by the heating unit 130 and intermittently conveys the preforms 200 to the blow molding unit 140. The delivery unit 170 delivers the preforms 200 continuously conveyed by the continuous conveying unit 150 from the conveying line 151 to the intermittent conveying unit 160.

In the present embodiment, a plurality of (for example, eight) conveying jigs 152 continuous in a conveying direction is connected by a connecting member (not illustrated). Then, the continuous conveying unit 150 repeats driving and stopping by sprockets 154a on the conveying line 151 on a downstream side of a curved conveying unit 155 curved at a predetermined radius, thereby supplying the (M, e.g., four) preforms 200 to the delivery unit 170 at a time.

The delivery unit 170 includes a reversing device (not illustrated) at a delivery position P0. The preforms 200 conveyed in the inverted state along the conveying line 151 are inverted by the reversing device disposed on the upper side of the preforms 200 at the delivery position P0 to be in the upright state. In addition, the delivery unit 170 includes, for example, a lifting device (not illustrated) that lifts and lowers the reversing device, and delivers the preforms 200 in the upright state to the intermittent conveying unit 160 in a state of being lifted to a predetermined position (delivery position P1).

The intermittent conveying unit 160 grips the neck portion of each of the preforms 200 in the upright state by an openable and closable blow conveying chuck member (not illustrated) provided in the intermittent conveying unit 160. Then, the chuck member (not illustrated) of the intermittent conveying unit 160 grips the neck portion of the preform 200 at the delivery position P1 located above the delivery position P0, and moves the preform 200 from the delivery position P1 to a blow molding position P2. As a result, the preforms 200 are conveyed to the blow molding unit 140 at predetermined intervals.

The blow molding unit 140 includes a pair of blow cavity molds 141 that are split molds corresponding to shapes of containers and an air introduction member (not illustrated) that also serves as a stretching rod. In the blow molding unit 140, predetermined number of the preforms 200 received from the delivery unit 170 are conveyed to the blow cavity molds 141, and the preforms 200 are subjected to stretch blow molding by the blow cavity molds 141 to manufacture containers.

The containers manufactured by the blow molding unit 140 are conveyed to a taking-out position P3 outside the blow molding unit 140 by the intermittent conveying unit 160.

<Description of Cooling Pots>

Next, configuration examples of the cooling pots 300 of the injection molding unit 110 and the cooling unit 120 will be described with reference to FIGS. 5 and 6.

As described above, the first cooling pots 300a and the second cooling pots 300b of the cooling unit 120 are similar to the cooling pots 300 of the receiving unit 115. Therefore, here, the configuration of the cooling pots 300 of the receiving unit 115 will be described, and redundant description will be omitted.

Figure 5A:
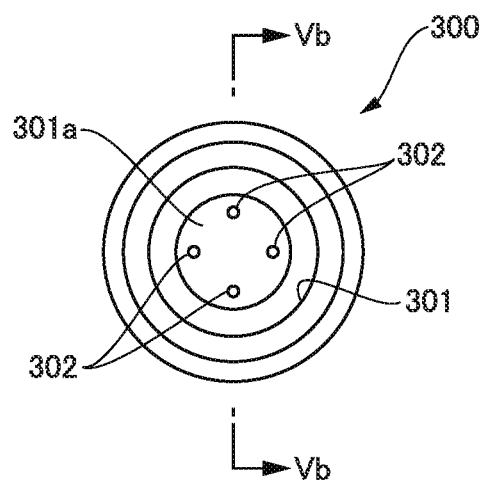
FIGS. 5A and 5B are views illustrating a configuration example of a cooling pot.
Figure 5B:
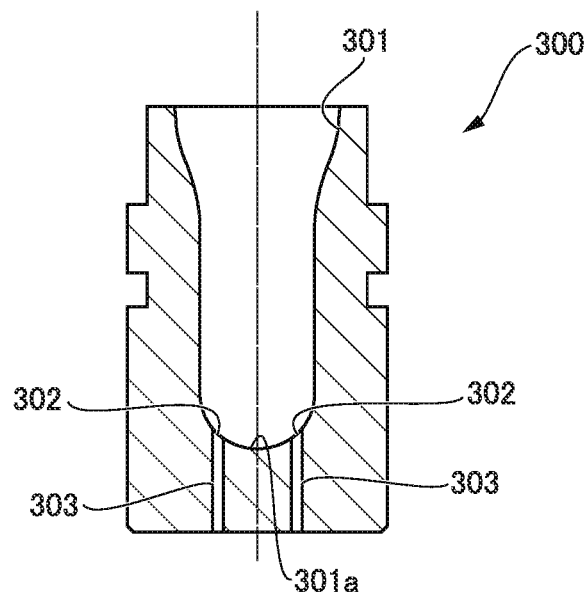

FIG. 5A is a plan view of each of the cooling pots 300, and FIG. 5B is a sectional view taken along a line Vb-Vb in FIG. 5A.

The cooling pot 300 has a bottomed cylindrical shape as a whole, and is a cooling mold into which the preform 200 can be inserted from an upper surface side. The cooling pot 300 has an accommodating space 301 capable of accommodating the body portion 201 and the bottom portion 202 of the preform 200 and having an open upper surface side.

An internal shape of the accommodating space 301 is a shape following outer shapes of the body portion 201 and the bottom portion 202 of the preform 200.

In the accommodating space 301 of the cooling pot 300, air sucking holes 302 for sucking air between the mold and the preform 200 are formed in a bottom region 301a facing the bottom portion 202 of the preform 200. Each of the air sucking holes 302 is connected to an air sucking pump (not illustrated) via an air flow path 303 formed in the cooling pot 300.

The air sucking hole 302 is formed at a position shifted from a center of the bottom portion of the preform 200 in the bottom region 301a of the accommodating space 301. In other words, there is no air sucking hole 302 at a position facing the gate portion 203 of the preform 200 in the cooling pot 300 (center of an axial direction of the cooling pot 300), and a surface of the bottom region 301a following the outer shape of the bottom portion 202 of the preform 200 faces the gate portion 203.

The air sucking holes 302 are formed in the bottom region 301a of the accommodating space 301 so as to be rotationally symmetric with respect to the center of the bottom portion of the preform 200. FIG. 5A illustrates an example in which four of the air sucking holes 302 are disposed at intervals of 90 degrees in a circumferential direction of an inner peripheral surface of the bottom region 301a so as to be point-symmetric with respect to the center of the bottom region 301a (position faced by the center of the bottom portion of preform 200, the center of the axial direction of the cooling pot 300). Note that the number of the air sucking holes 302 provided may be a number other than four (two, three, or more integers) as long as disposition is rotationally symmetric with respect to the center of the bottom portion of the preform 200. Further, an annular air sucking hole (not illustrated) concentric with the center of the bottom portion of the preform 200 may be formed.

Figure 6A:
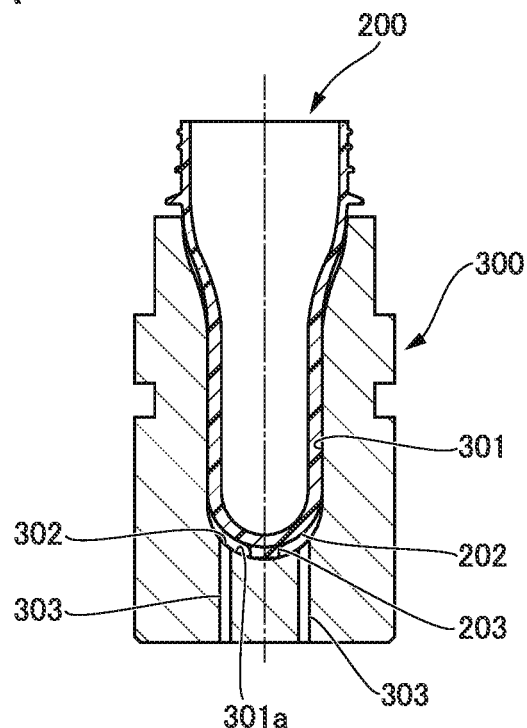
FIGS. 6A and 6B are views illustrating removal of a gate portion by a cooling pot.
Figure 6B:
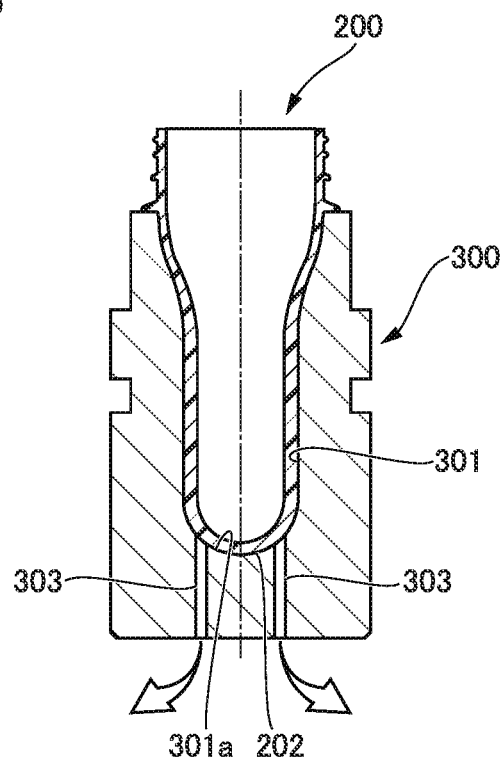

FIG. 6A is a schematic view illustrating a state before air between the cooling pot 300 and the preform 200 is sucked, and FIG. 6B is a schematic view illustrating a state after air between the cooling pot 300 and the preform 200 is sucked.

When air is sucked from the air sucking holes 302 in a state where the preform 200 is disposed in the accommodating space 301 of the cooling pot 300 (see FIG. 6A), the preform 200 is drawn inward into the accommodating space 301 and comes into close contact with the cooling pot 300 (see FIG. 6B).

As a result, the body portion 201 and the bottom portion 202 of the preform 200 come into surface contact with a surface of the accommodating space 301, and the preform 200 is efficiently cooled by heat exchange with the cooling pot 300. Since a shape of the accommodating space 301 of the cooling pot 300 follows the outer shape of the preform 200, the shape of the preform 200 is maintained by the cooling pot 300 at a time of cooling.

Here, since the preform 200 has residual heat from injection molding, the gate portion 203 is easily deformed. Therefore, when the preform 200 is drawn inward into the accommodating space 301 as described above, the gate portion 203 located at the center of the bottom portion of the preform 200 is collapsed on the surface of the opposing bottom region 301a. As a result, as illustrated in FIG. 6B, the shape of the bottom portion of the preform becomes a curved surface following the bottom region 301a of the accommodating space 301.

As described above, in the present embodiment, the gate portion 203 is removed from the bottom portion 202 of the preform 200 with high accuracy in a process of cooling the preform 200 with the cooling pot 300.

Further, the air sucking holes 302 are located at the positions shifted from the center of the bottom portion of the preform 200, but are disposed so as to be rotationally symmetric. Therefore, sucking power when the preform 200 is drawn substantially uniformly acts on the bottom portion 202 of the preform 200. Thus, it is possible to suppress distortion from occurring in the bottom portion 202 of the preform 200 when the preform 200 is drawn inward into the accommodating space 301.

The first cooling pot 300a and the second cooling pot 300b of the cooling unit 120 also function similarly to the cooling pot 300 described above. Although the cooling unit 120 inverts the preform 200 received in the upright state to the inverted state, the cooling unit 120 can adsorb and hold the preform 200 in the inverted state by sucking air from the air sucking holes 302.

<Description of Blow Molding Methods>

Next, a blow molding method by the blow molding apparatus 100 according to the present embodiment will be described.

Figure 7:
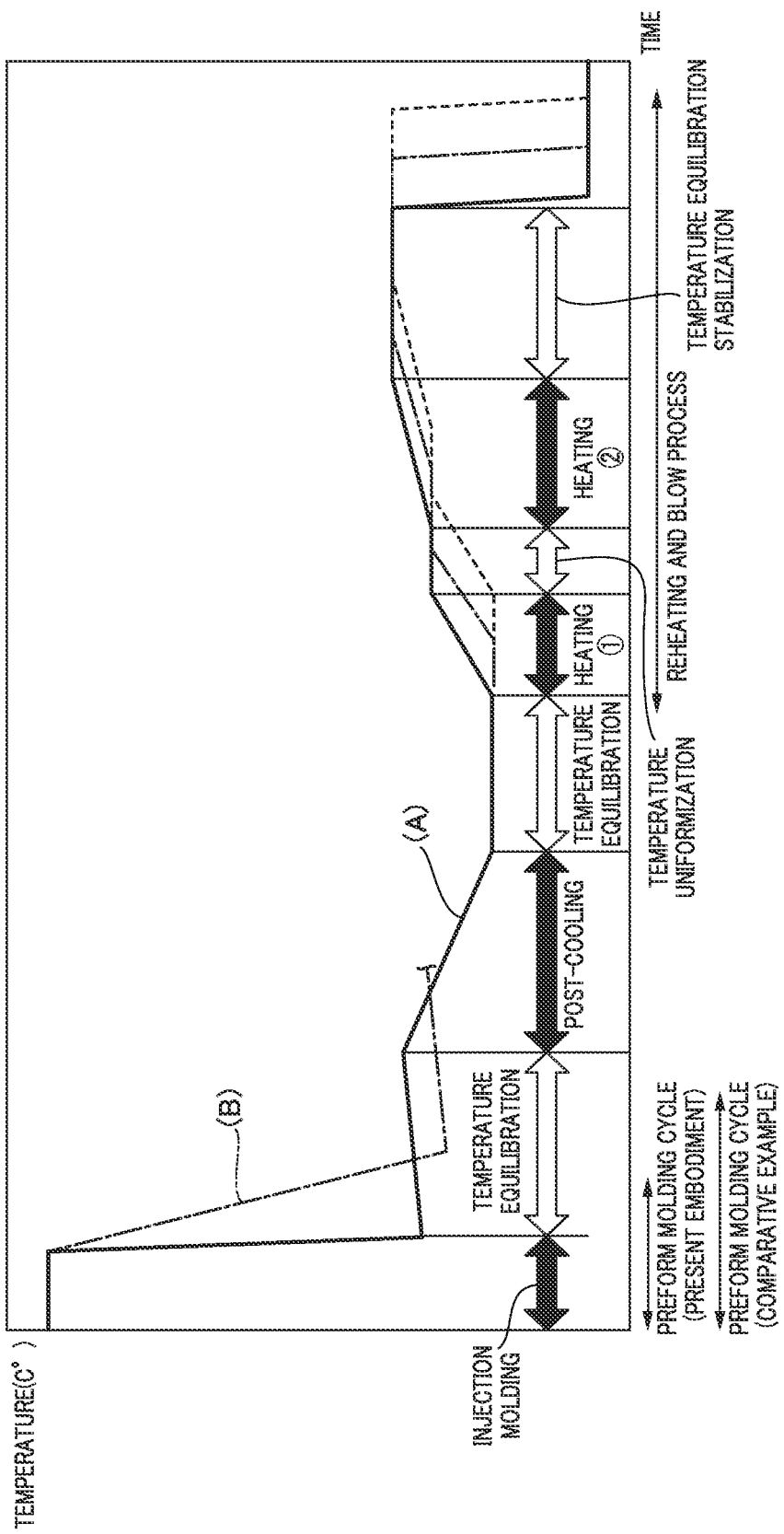
FIG. 7 is a graph illustrating an example of temperature changes of a preform in a blow molding method according to the present embodiment.

FIG. 7 is a diagram for explaining temperature changes of the preform 200 in the blow-molding method according to the present embodiment. In FIG. 7, a vertical axis represents a temperature of the preform 200, and a horizontal axis represents time. In FIG. 7, examples of temperature changes of the preform according to the present embodiment are indicated by (A) in FIG. 7. Examples of temperature changes of the preform in a comparative example (conventional method) described later are indicated by (B) in FIG. 7.

(1) First, in the injection molding unit 110, a resin is injected from an injection device into preform-shaped mold spaces formed by the core molds 111 and the cavity molds 112 to manufacture N preforms 200.

In the present embodiment, the injection molding unit 110 is opened immediately after completion of resin filling or after minimum cooldown time provided after resin filling, and the preforms 200 are released from the core molds 111 and the cavity molds 112 in a high temperature state in which the outer shapes of the preforms 200 can be maintained. In short, in the present embodiment, when the resin material is injected at a temperature equal to or higher than a melting point of the resin material, only minimum cooling of the preforms 200 after injection molding is performed in the injection molding unit 110, and the preforms 200 are cooled in the cooling pots 300 of the receiving unit 115 or the first cooling pots 300a or the second cooling pots 300b in the cooling unit 120.

In the present embodiment, time (cooldown time) for cooling the resin material by the injection molding unit 110 after completion of injection of the resin material is preferably ½ or less with respect to time (injection time) for injecting the resin material. The time for cooling the resin material can be made shorter than the time for injecting the resin material depending on weight of the resin material. The time for cooling the resin material is more preferably ⅖ or less, still more preferably ¼ or less, and particularly preferably ⅕ or less with respect to the time for injecting the resin material. Since the cooldown time is significantly shortened as compared with the comparative example described later, a skin layer (surface layer in a solidified state) of a preform is formed to be thinner than before, and a core layer (inner layer in a softened or molten state) is formed to be thicker than before. In other words, as compared with the comparative example, a preform having a large heat gradient between the skin layer and the core layer and having high residual heat at a high temperature is molded.

On the other hand, as a comparative example, when the preforms 200 are cooled in the core molds 111 and the cavity molds 112, examples of temperature changes of the preforms ((B) in FIG. 7) will be described.

In the comparative example, each of the preforms 200 is cooled to a temperature lower than one in the present embodiment in the molds of the injection molding unit 110. Therefore, in the comparative example, the molding cycle time of a preform becomes longer than that in the present embodiment, and as a result, the molding cycle time of a container also becomes longer.

(2) The N preforms 200 manufactured in the injection molding unit 110 are delivered in the upright state to the cooling pots 300 of the receiving unit 115 and carried out from the injection molding unit 110. In each of the cooling pots 300, each of the preforms 200 is cooled and the gate portion 203 is removed as described above.

(3) At the delivery position of the receiving unit 115, the N preforms 200 are delivered to the conveying device 180 and conveyed in the upright state to the cooling unit 120. In the cooling unit 120, the conveyed N preforms 200 are accommodated in either the first cooling pots 300a or the second cooling pots 300b. Thereafter, the cooling unit 120 is reversed, and the preforms 200 are in the inverted state and delivered to the conveying jigs 152 of the continuous conveying units 150.

In the first cooling pots 300a and the second cooling pots 300b in the cooling unit 120, the preforms 200 are cooled. At this time, in the first cooling pots 300a and the second cooling pots 300b, the preforms 200 are sucked and held by air suction, and the gate portions 203 are further removed. The gate portions 203 are removed twice, that is, in the cooling pots 300 of the receiving unit 115 and the first cooling pots 300a or the second cooling pots 300b of the cooling unit 120, so that the gate portions 203 of the preforms 200 can be removed with higher accuracy.

Furthermore, in the present embodiment, for example, the N preforms 200 in the upright state, injection-molded in the m-th cycle are held by the first cooling pots 300a, then inverted by the inverting unit 121, and cooled in the inverted state. During this period, the N preforms 200 in the upright state, injection-molded in a cycle following the m-th cycle (m+1-th cycle) are held and cooled in the second cooling pots 300b. In short, the cooling unit 120 can simultaneously cool the preforms 200 in different cycles on the first surface 121a and the second surface 121b.

As described above, the cooling unit 120 can forcibly cool the preforms 200 for a time equal to or longer than the cycle time of injection molding when the injection molding unit 110 injection-molds the N preforms 200.

Since the preforms 200 forcibly cooled in the cooling unit 120 do not need to be cooled to a room temperature and the preforms 200 have heat from injection molding, it is possible in the present embodiment as well to share advantages of energy efficiency in the one stage method.

Although the N preforms 200 immediately before heating have residual heat from injection molding, clear temperature differences may occur among the cycles of blow molding described later, depending on natural cooling time due to time differences among the cycles of blow molding. The forced cooling in the cooling unit 120 is effective, when the N preforms 200 simultaneously injection-molded are heated at different heating start timings, in suppressing temperature differences of the preforms 200 immediately before heating in each cycle of blow molding.

(4) The preforms 200 in the inverted state are continuously conveyed along the conveying line 151 of the continuous conveying unit 150 and pass through the heating unit 130. As a result, the preforms 200 are subjected to temperature equalization and removal of uneven temperature, and heated to an appropriate stretching temperature.

Here, the N preforms 200 simultaneously injection-molded in the m-th cycle are blow-molded a plurality of times (three times) by M preforms 200. Therefore, a line indicating temperature changes in FIG. 7 is different for each blow molding cycle. In other words, in FIG. 7, the temperature changes of the preforms until carried into the continuous conveying unit 150 are common regardless of the blow molding cycle. However, the temperature changes of the preforms from heating to blow molding are indicated by three lines having time differences according to the cycles of blow molding.

(5) The preforms 200 that have passed through the heating unit 130 are delivered to the intermittent conveying unit 160 by the delivery unit 170 for each number (M) of containers that are to be simultaneously blow-molded. The intermittent conveying unit 160 intermittently conveys the M preforms to the blow molding unit 140.

(6) In the blow molding unit 140, the preforms 200 are subjected to stretch blow-molding, and containers are manufactured. Thereafter, the containers manufactured by the blow molding unit 140 are carried out from the blow molding unit 140 by the intermittent conveying unit 160.

Thus, a series of processes of the blow molding method is completed.

Hereinafter, effects of the present embodiment will be described.

According to the present embodiment, air between the accommodating spaces 301 of the cooling pots 300 for cooling the preforms 200 and the preforms 200 is sucked, and the gate portions 203 of the preforms 200 are collapsed on the surface of the bottom regions 301a of the accommodating spaces 301. As a result, since shapes of the bottom portions 202 of the preforms 200 become curved surfaces following the bottom regions 301a of the accommodating spaces 301, the gate portions 203 can be removed from the bottom portions 202 of the preforms 200 with high accuracy, and an aesthetic appearance of containers to be manufactured can be improved.

In addition, the removal of the gate portions 203 is carried out simultaneously when the preforms 200 are accommodated in the cooling pots 300, using the process of cooling the injection-molded preforms 200. Therefore, in the present embodiment, since it is not necessary to newly add a process of cutting off the gate portions 203 of the preforms 200, molding cycle time of containers is not extended by the removal of the gate portions 203.

Further, in the removal of the gate portions 203 described above, the gate portions 203 are collapsed and integrated with the bottom portions 202 of the preforms, so that fragments are not produced with the removal of the gate portions 203. Therefore, discarding or regenerating the fragments of the gate portions 203 is not necessary, thereby reducing costs associated with manufacturing containers.

Furthermore, the removal of the gate portions 203 can be performed twice, that is, in the cooling pots 300 of the receiving unit 115 and the first cooling pots 300a or the second cooling pots 300b in the cooling unit 120. As described above, by removing the gate portions 203 twice, the gate portions 203 can be removed from the bottom portions 202 of the preforms 200 with higher accuracy.

The present invention is not limited to the above embodiment, and various improvements and design changes may be made without departing from the gist of the present invention.

For example, in the above embodiment, the example in which the cooling pots 300 of the present invention are disposed in the receiving unit 115 and the cooling unit 120 has been described, but the cooling pots of the present invention may be disposed in only either one thereof.

In the above embodiment, as an example, the configuration in which the cooling pots 300 are applied to the blow molding apparatus in the 1.5 step method has been described. However, the cooling pots 300 according to the present embodiment may be applied to an injection molding machine without a blow molding unit to remove the gate portions.

Figure 8:
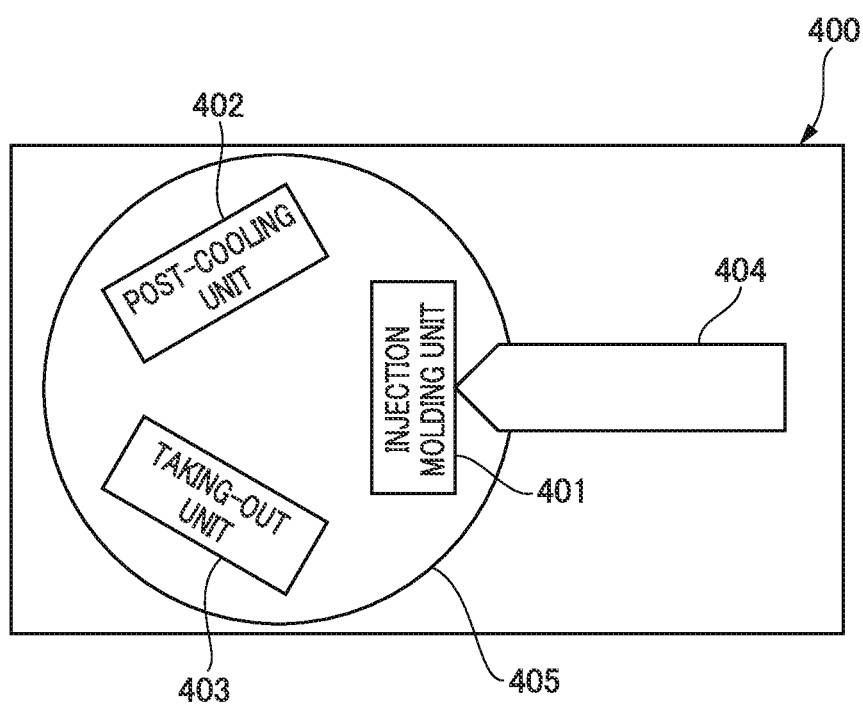
FIG. 8 is a diagram schematically illustrating a configuration of an injection molding apparatus.

FIG. 8 is a diagram schematically illustrating a configuration of an injection molding apparatus 400. The injection molding apparatus 400 in FIG. 8 is a apparatus used for manufacturing the preforms 200 at a high speed. The injection molding apparatus 400 includes an injection molding unit 401, a post-cooling unit 402, a taking-out unit 403, and a rotating plate 405 as a conveying mechanism.

The injection molding unit 401, the post-cooling unit 402, and the taking-out unit 403 are disposed at positions rotated by a predetermined angle (for example, 120 degrees) in a circumferential direction of the rotating plate 404. In the injection molding apparatus 400, rotation of the rotating plate 405 conveys the preforms 200 having the neck portions held by the rotating plate 405 to the injection molding unit 401, the post-cooling unit 402, and the taking-out unit 403 in this order.

The injection molding unit 401 includes injection cavity molds and injection core molds (both not illustrated), and manufactures the preforms 200 by injection molding. An injection device 404 that supplies a resin material, which is a raw material of the preforms 200, is connected to the injection molding unit 401.

The post-cooling unit 402 can provide cooling in a short time to such an extent that the preforms 200 can be discharged in a cured state by the taking-out unit 403. The post-cooling unit 402 includes the above-described cooling pots 300, accommodates the preforms 200 in the cooling pots 300 by suction of air, and simultaneously performs cooling and removal of the gates.

The removing unit 403 releases the neck portions of the preforms 200 from the rotating plate 405 and takes out the preforms 200 to outside of the injection molding apparatus 400.

In the injection molding apparatus 400, the post-cooling unit 402 is provided on a downstream side of the injection molding unit 401, so that the post-cooling unit 402 can additionally cool the preforms 200. Additional cooling of the preforms 200 in the post-cooling unit 402 can release the preforms 200 even in a high temperature state in the injection molding unit 401, and significantly shorten the cooldown time of the preforms 200 in the injection molding unit 401. As a result, since molding of the subsequent preforms 200 can be started early, molding cycle time of the preforms 200 in the injection molding apparatus 400 can be shortened.

Furthermore, in the post-cooling unit 402 of the injection molding apparatus 400, the gate portions can be satisfactorily removed from the preforms 200 by using the cooling pots 300 described above.

In the above embodiment, the example in which the air sucking holes 302 of each of the cooling pots 300 are disposed rotationally symmetrically has been described, but the disposition of the air sucking holes 302 is not limited to the above. For example, in the two or more air sucking holes 302, radial distances of the air sucking holes 302 from a central axis may be different. For example, in the bottom surface region 301a of the cooling pot 300, the two or more air sucking holes 302 may be provided on the inner peripheral surface in a predetermined range extending in a vertical direction away from a center (the central axis of the cooling pot 300) which the gate portion 203 of each of the preforms 200 abuts.

Additionally, the embodiments disclosed herein are to be considered as illustrative in all respects and not restrictive. The scope of the present invention is indicated not by the above description but by the claims, and it is intended that meanings equivalent to the claims and all modifications within the scope are included.

The invention claimed is:

1. A mold for cooling a resin preform that has a gate portion protruding outward from a center of a bottom portion, wherein
an accommodating space that accommodates the preform is formed in the mold,
a bottom region facing the bottom portion of the preform in the accommodating space has an internal shape following an outer shape of the bottom portion of the preform, and
a plurality of air sucking holes that sucks air is formed in the bottom region at a position shifted from the center of the bottom portion of the preform,
such that there is no air sucking hole at a position facing the gate portion of the preform in the mold, and an internal surface of the bottom region following the outer shape of the bottom portion of the preform faces the gate portion,
such that the mold is adapted for:
sucking air from the air sucking holes of the mold and drawing the preform into the accommodating space; and
collapsing the gate portion in the bottom region to remove the gate portion.

2. The mold according to claim 1, wherein,
wherein the accommodating space comprises a region facing the body portion of the preform and the bottom region facing the bottom portion of the preform, wherein the region and the bottom region of the accommodating space are formed as single member.

3. The mold according to claim 1, wherein
the plurality of the air sucking holes is formed in the bottom region so as to be rotationally symmetric with respect to the center of the bottom portion of the preform.

4. An apparatus for manufacturing a resin molded article, comprising:
an injection molding unit configured to injection-mold a resin preform having a gate portion protruding outward from a center of a bottom portion; and
a mold according to claim 1, the mold is configured for accommodating and cooling the injection-molded resin preform in the accommodating space, wherein the mold is configured for sucking air from the air sucking holes to draw the preform into the accommodating space and collapsing the gate portion in the bottom region to remove the gate portion.

5. The apparatus for manufacturing the resin molded article according to claim 4, wherein the mold is disposed in at least either a receiving unit configured to carry out the preform from the injection molding unit or a cooling unit configured to cool the preform carried out from the injection molding unit.

6. The apparatus for manufacturing the resin molded article according to claim 5, further comprising:
a heating unit configured to continuously convey and heat the preform cooled in the cooling unit; and
a blow molding unit configured to blow-mold the preform after heating to manufacture a resin container.

7. The apparatus for manufacturing the resin molded article according to claim 6, wherein
a cycle of the blow molding in the blow molding unit is shorter than a cycle of injection molding of the preform in the injection molding unit, and
a plurality of the preforms molded in one cycle of the injection molding unit is blow-molded in a plurality of the blow molding cycles.

8. A method for manufacturing a resin molded article using a mold according to claim 1, the method comprising:
accommodating and cooling a resin preform having a gate portion protruding outward from a center of a bottom portion in the accommodating space of the mold;
sucking air from the air sucking holes of the mold;
drawing the preform into the accommodating space; and
collapsing the gate portion in the bottom region to remove the gate portion.

* * * * *